United States Patent [19]
Widener

[11] 4,007,437
[45] Feb. 8, 1977

[54] ACOUSTIC FOGHORN FOR DIRECTIONAL SIGNALING

[75] Inventor: Maurice Ward Widener, Austin, Tex.

[73] Assignee: The United States of America as represented by the Secretary of the Navy, Washington, D.C.

[22] Filed: Aug. 20, 1975

[21] Appl. No.: 606,045

[52] U.S. Cl. .............................. 340/16 R; 340/3 A; 340/5 R; 343/106 R

[51] Int. Cl.² ......................................... G01S 1/72

[58] Field of Search ................ 340/3 A, 5 R, 16 R; 343/106

[56] References Cited
UNITED STATES PATENTS

| | | | |
|---|---|---|---|
| 1,961,767 | 6/1934 | Key | 340/5 R |
| 2,112,283 | 3/1938 | Fritz | 343/106 R |
| 2,297,395 | 9/1942 | Erben | 343/106 R |
| 3,721,950 | 3/1973 | Jorgensen et al. | 343/106 R X |
| 3,723,957 | 3/1973 | Damon | 340/5 R |

*Primary Examiner*—Richard A. Farley
*Attorney, Agent, or Firm*—Richard S. Sciascia; George A. Montanye

[57] ABSTRACT

A method of creating a highly directional acoustic beam that can be swept over the water near the entrance of a harbor or channel location. The information provided to a boat operator as a result of the acoustic beam includes the operator's absolute bearing from the acoustic source. The nonlinear acoustic beam has a narrow beamwidth and is produced by small transducers that can be rotated in a selected scanning motion to provide a sequence of acoustic signals easily recognizable by the unaided human air of the boat operator who is cognizant of the acoustic sequence.

2 Claims, 5 Drawing Figures

ACOUSTIC FOGHORN FOR DIRECTIONAL SIGNALING

The invention described herein may be manufactured and used by or for the Government of the United States of America for governmental purposes without the payment of any royalties thereon or therefor.

BACKGROUND OF THE INVENTION

The invention pertains to navigational systems and specifically to an acoustical system capable of providing auditory information to a small boat operator regarding the relative location of a channel or the like when visual navigation is restricted.

Under conditions of fog or darkness, a small boat operator whose boat is not equipped with radar or other navigational systems is placed in danger under such circumstances and at the least becomes inconvenienced. Accordingly, when fog eliminates visual navigation, the small boat operator may attempt to find an anchor or tie-up point and wait for the fog to lift. Marker buoys serve as good temporary stopping points and these often have acoustic sources to assist in their location by simple directional listening through the fog. It would be more advantageous, however, for the boat operator to continue his course and proceed directly to the desired harbor or through the selected channel.

Although there are methods presently available for aiding in navigation near ports and harbor entrances when visual contact is lost, the small boat operator can hardly afford such expensive systems. Such systems include radar, distance measuring equipment and complicated charts and computers.

Therefore, it is an object of this invention to provide an inexpensive method for aiding a small boat operator in determining his location relative to a port or harbor entrance.

Another object of this invention is to provide a small boat operator with such information when visual conditions are so restricted as to prevent visual navigation.

It is a further object of this invention to provide a small boat operator with knowledge by simply listening to an anticipated sequence of directional sounds produced by an acoustic source.

And yet a further object of this invention is to provide a small boat operator with information regarding the location of a port or harbor entrance with respect to its own location without the introduction of an ambiguous component.

In addition to the above objects and advantages of this invention is a pair of fixed acoustic sources so positioned that both can be heard within a reasonable distance of a channel opening. Each acoustic source transmits a different tone on a narrow beam that sweeps across the water producing a sequence of pulses to a boat operator. The unaided human ear is able to decipher the tones in order to provide accurate information as to the exact bearing of the boat from the acoustic source. Moreover, the meterological conditions which are conducive to the formation of fog also includes favorable conditions for the propagation of acoustic signals. Specifically, the formation of fog often includes a stable movement of moisture laden tropical air into an area having relatively cold water. Radiation cooling also contributes to the creating of saturated air necessary for the formation of fog. Usually accompanied with the formation of fog is a low wind velocity. Therefore unless there is a significant noise level from wave action in surf, the background sound levels are low and favor the transmission and reception of the acoustic signal.

Other objects, advantages and novel features of the invention will become apparent from the following detailed description of the invention when considered in conjunction with the accompanying drawing wherein.

SUMMARY OF THE INVENTION

The invention includes the generation of a nonlinear acoustic beam having a narrow beamwidth which can be retained in a selected known scanning motion to provide a sequence of acoustic signals easily received by the unaided human ear. The invention permits the transmission of bearing information to a small boat owner without any special receiving apparatus except his own innate hearing ability. The sequence of signals received by the small boat owner can be interpreted by him from his knowledge of the system operation sequence to provide the angular location of his boat during fog and at any other time when visibility is impaired. The directional beams produced by nonlinear acoustic properties of the air do not require the large transducers normally associated with directional beams at frequencies good for ear sensitivity. Therefore, the signal generating system avoids noise pollution of the shore area near the acoustic source because the beams do not spread outside the desired direction.

Figure 1:
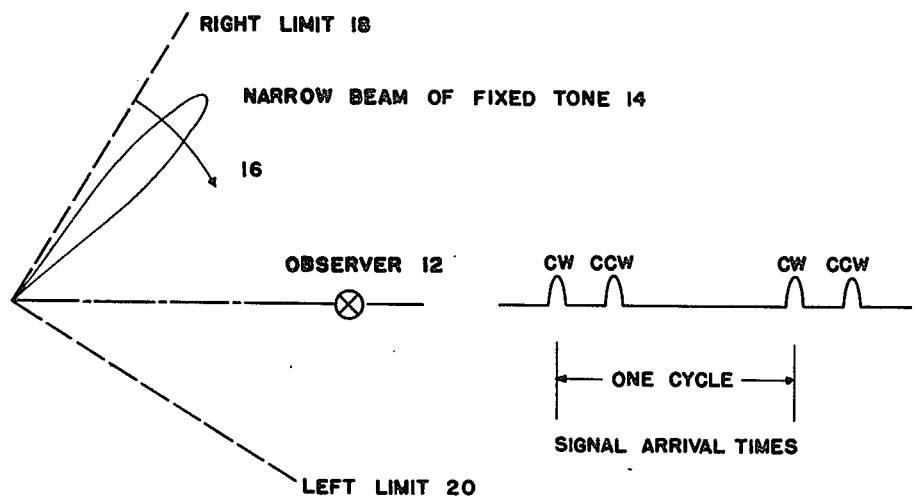
FIG. 1 depicts the projection of the narrow acoustic beam from a point source in accordance with the invention.

Referring to FIG. 1, consider a narrow transmission beam of fixed tone 14 located at point and having a continuous audible output sweeping at a constant rate 16 over a selected sector with directional reverses occurring at the scanning limits 18 and 20. The relative time between the signal arrival is a function of the observer's position relative to the center of the sector. If the observer is located directly in the center of the sector, as shown in FIG. 1, the signal would arrive equally spaced at one half of the scan cycle time. Similarly, if the observer were located at the edge of a sector, the signal arrival times would be one signal per scanned cycle. In other words, when the observer is located in the center of the sector the times between two pulses is equal. When, for example, the observer is located near left limit 20, the pulses would be very close together in time and there would be a longer duration before a pulse pair returned again. The "one cycle signal arrival times" depicted in FIG. 1 shows the relative time of occurrence of the pulses at a typical receiving point 12 and the direction of the beam sweep, clockwise or counter clockwise.

The drawback to this time signal fixed tone system is that an ambiguity is created when the observer or the small boat operator does not know whether he is in the left of the right sector. However, if such a system as shown in FIG. 1 is utilized, the small boat operator is still able to make use of the known information while approaching the acoustic source by seeking out and following the bi-sector. This is accomplished simply by listening to the time between tones and keeping that time equal.

Figure 2:
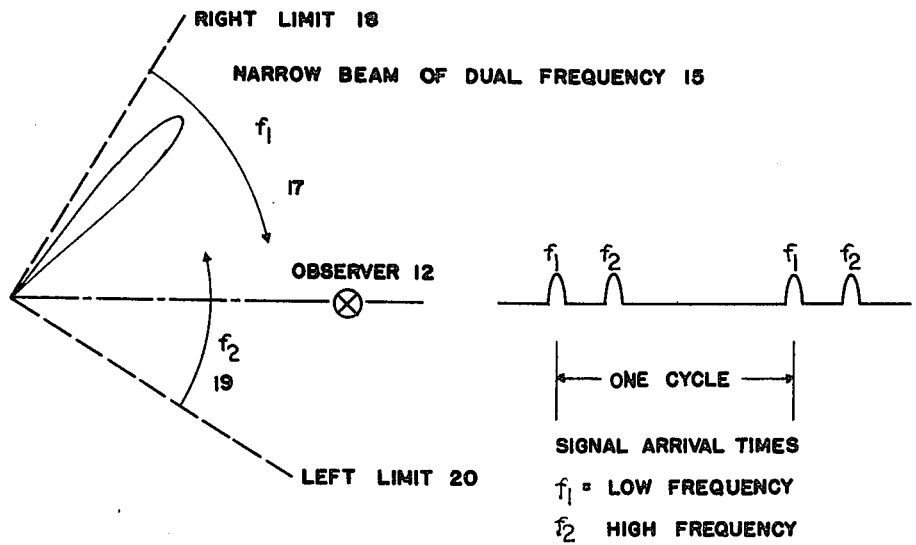
FIG. 2 depicts a narrow acoustic beam having dual frequencies in accordance with the invention.

The ambiguity created by the system shown in FIG. 1 regarding which sector the observer is located in, is easily resolved by a dual frequency beam. Such a system is shown in FIG. 2. A narrow beam of dual frequency 15 is projected from a point by an acoustic source and is scanned between limits 18 and 20. A first frequency is generated when the beam is swept in a clockwise manner 17 and a higher (or lower) tone is generated on the counter clockwise sweep 19. Thus, if the observer 12 hears a low tone followed quickly by a high tone he must conclude that he is located on the right sector of the approach. Selecting tones that are in the region of maximum ear sensitivity tends to enhance the directional localization of the source for binaural hearing. The "one cycle" arrival time depicted in FIG. 2 shows the relative time of occurrence of the pulses at a typical receiving point 12 and the direction of the beam sweep. Since the invention requires that the observer know the scan rate and tone information indicative of a particular harbor or channel, it would be necessary that navigational charts depicting a channel approach include the proper information.

Figure 3:
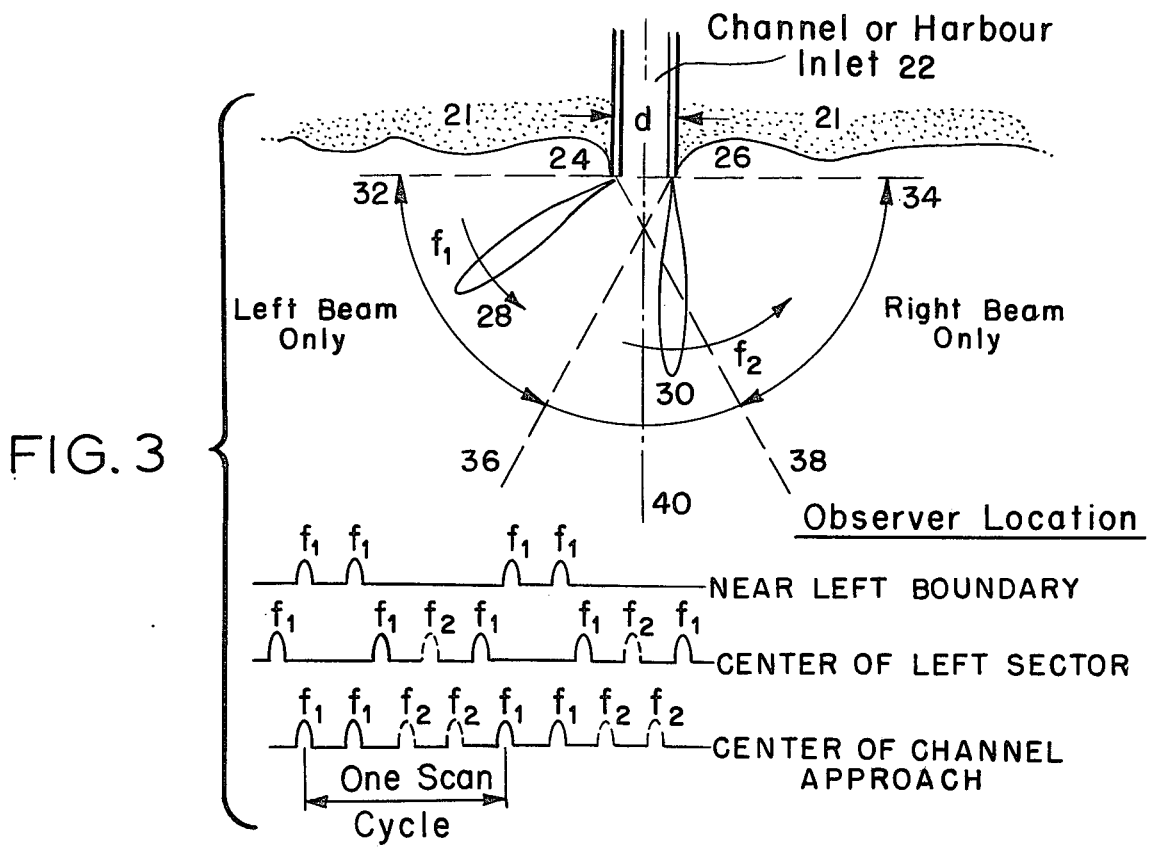
FIG. 3 shows a navigational system placed at the entrance of a harbor or channel.

Referring to FIG. 3, a navigational system is shown wherein guidance to the center of the channel is enhanced by deploying two acoustic sources, one on each side of the channel or harbor entrance. A first acoustic source 24 is located on the left side of the channel located along shore 21. Similarly, the second acoustic source 26 is located at the right side of the channel separated a distance $d$ indicative of the width of the channel. The total acquisition sector of channel approach can be divided into three equal sectors. For example, each sector may be 60° as shown in the Figure and are left sector 32–36; center sectors 36–38; and right sectors 38–34. The scanning beam 28 emitting from acoustic source 24 is swept over the left and center sectors while the acoustic beam 38 emitting from acoustic source 26 is swept over the right and center sectors at the same rate as beam 28. Both beams are swept in the same direction as shown by the arrows. Different frequencies are emitted in each beam 28–30 so that in the center sector 36–38 both frequencies would be heard alternately as defined by the angular position and the position of the observer or small boat operator. Alignment of the boat with the center of the channel 40 would be indicated by equally spaced tone bursts, as shown in FIG. 3, and errors in approach to the channel would be observable by the occurrence of an asymmetrical tone sequence. An observer in the left sector 32–36 and the right sector 38–34 would hear only one frequency and a greater angular approach error would be indicated by unequal timing between successive tone bursts. Thru the use of navigational charts setting forth tone information, a small boat operator would be quickly familiar with his relative location to the channel.

An important advantage obtained by using the nonlinear acoustic technique as set forth is the elimination of difference frequency radiation in the normally expected side lobes. The beam frequency to be detected by the observer is restricted to the single major lobe which results from the high frequency interaction beams. There will be no observable difference frequency near the acoustic source unless the observer is located in the primary beams. The beam restriction makes it possible to maintain accuracy in navigation and also to avoid noise pollution in the immediate neighborhood of the system. Since there will be some side lobe energy spread at the primary frequencies, it is desirable that these be above the normal human hearing range. Another significant advantage of this invention is that the primary sound can be generated at very high frequencies from relatively small acoustic sources. Hence, mechanical problems are greatly reduced when such high directional beams are produced from small transducers.

The nonlinear acoustic beam is generated by a pair of acoustic transducers having a difference frequency in the audible range. The term nonlinear acoustic source includes pairs of acoustic generators mounted, for example, in an annular ring to project an intense acoustic beam.

The following is set forth in an effort to illustrate parameter selection. Assuming a difference frequency of 1.5 kHz for good hearing sensitivity and primary frequencies of 23.5 and 25 kHz to be above the normal hearing band, the attenuation for these three tones is 1.3 dB, 100 dB, and 120 dB per 1000 feet at 100% RH and 20° C respectively. The resulting beamwidth may be calculated by existing non-linear theory to be 4.45°. Now it is possible to make the assumption that the total primary beam has a dimension of 5° × 5°. This results from having to choose high frequencies where the absorption is significant. However, difference beamwidth can be reduced by decreasing the primary frequencies or increasing the difference frequency.

By assuming the requirement of a source level of 100 dB re 0.0002 dynes/cm$^2$ at 1 m at the difference frequency, the required power in the primary beams can be computed from $$100 = 127 + 20 \log 1.5 - 40 \log 4.45 + 20 \log W_o - 1.0 \text{ dB}$$

thus $W_o = 0.66$ W for each primary beam.

With the assumed beamwidth and its directivity index of 31 dB, the primary source level is 126.3 dB (re 0.0002 dyne/cm$^2$ at 1 dB m). The source level at the difference frequency will allow propagation in free space to a distance of 10,000 m before the resulting spreading loss and absorption reduces the signal level to about 10 dB re 0.0002 dynes/cm$^2$. This level is close to the minimum detectable level for normal hearing and the requirement for low ambient noise is obvious. The ambient noise levels at sea in fog with engines stopped have been measured on the order of 35 dB in a one-third octave band.

Propagation measurements were made for a path over water in the presence of fog and a significant signal loss was reported when the propagation direction was upwind. Apparently the wind velocity gradient caused bending of the sound path upward, creating a shadow zone at a range of 1000 yd. However, at a range of 4000 yd, the sound level exceeded that predicted by spreading loss, indicating a possible convergence zone. The data collected did not permit the establishment of a cause for the improvement in sound level at longer ranges. At such ranges it was observed that some multipath reverberation was present. There were possible reflections from the upper boundary of the fog layer but no ambient conditions were measured at such heights. Propagation downwind was not accompanied by a shadow effect and the signal losses followed the expected range spreading more closely. If the reported 30 dB excess loss at 1000 yd is typical of fog conditions with low wind velocities, then it would be desirable to increase the primary source level perhaps 10 dB or to about 135 dB (re 0.0002 dyne/cm$^2$ at 1 m).

Figure 4:
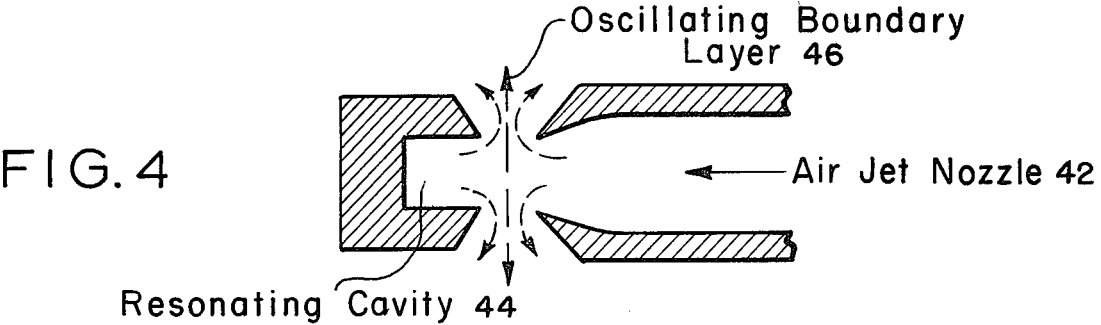
FIG. 4 depicts a Hartman gas jet whistle capable of providing an acoustic signal in accordance with the invention.

Referring to FIG. 4, generation of the source energy is relatively simple and direct if pneumatic oscillators are used. A source of this design, illustrated in FIG. 4, has been constructed from Hartmann gas jet radiators and the source level can be expected to be in the order of 150 dB. The oscillator shown in FIG. 4 consists of a jet of air directed thru nozzle 42 into a resonating cavity 44 with resulting oscillation of the flow boundary 46. The frequency is controlled by design of the cavity 44. When several jets as typified by FIG. 4 are mounted in an annular ring at the throat of an exponential horn, an intense beam of sound can be projected. Of course the advantages of employing small transducers and the elimination of side lobes are obtained at the expense of power efficiency. An exponential horn design having the desired beamwidth for the practice of this invention would have a physical size of about 45 cm length and a 15 cm mount diameter.

Figure 5:
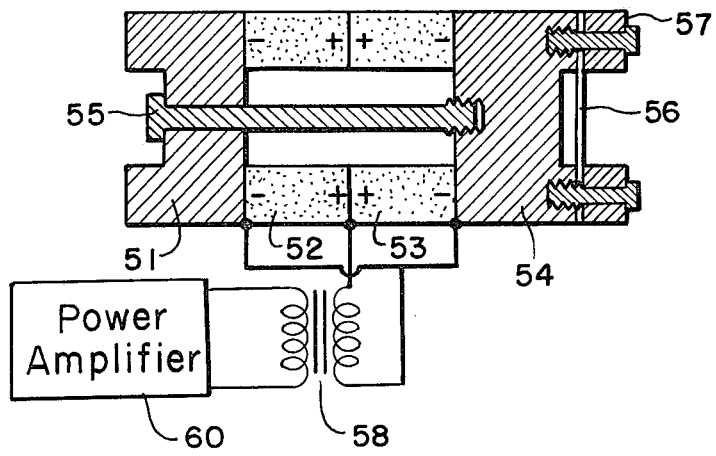
FIG. 5 depicts a narrow band mechanical plate resonator also capable of providing an acoustic signal in accordance with the invention.

Referring to FIG. 5 an alternative to the Hartman oscillator is presented. This device is capable of generating a high intensity sound beam developed by the use of a narrow band mechanical plate resonator. As shown in FIG. 5, a large mass load 51 is held in an abutting relationship with annularly disposed piezoelectric rings 52 and 53 by bolt 55 which is removably attached to a second large mass load 54. The piezoelectric rings are of a material such as barium titinate; polarized axially in a balanced configuration as shown in the figure. Bolt 54 should be tightened down to provide sufficient compression to assure that rings 52 and 53 are always operated under compression. A thin diaphragm 56 is removably attached to large mass load 54 by the use of clamping ring 57, so that a cavity is maintained between it and the large mass load 54. The thin diaphragm 56 is constructed of a special material designed to have a high fatigue limit in flexure. Such material could include items such as berillium copper. During operation, power amplifier 60 provides energy to transformer 58 which in turn energizes the piezoelectric rings 53 and 54. This causes vibrational energy which in turn draws membrane 56 into resonance at a high amplitude. Sound is therefore radiated.

It should be obvious from the above teachings that one may utilize the properties of the directional beam to his own particular advantage for navigational purposes after he understands and appreciates the teachings of this invention. For example, each installation may have special problems that would require a different scanning technique. An example of such a technique would be a channel marker system that guides a small boat operator down the right side of the channel by means of fixed beams that do not sweep yet serve to localize and indicate the safe part of the channel from one marker buoy to the next. Another technique might be to place a series of beams which are operated in sequence from a line of sources along the edge of the channel so that the boat operator can identify each source in turn and estimate his position along the channel from their direction and strength. Also it should be apparent to those skilled in the art that in areas where one may expect a high shear wind, the height of the acoustic source need necessarily be increased to a height commensurate with the propagation range desired.

Obviously many modifications and variations of the present invention are possible in the light of the above teachings. It is therefore to be understood that within the scope of the appended claims the invention may be practiced otherwise than as specifically described.

I claim:
1. A method of providing bearing information to an operator of a boat or ship located near a channel the entrance having a first and second side thereto comprising:
   a. positioning a first non-linear rotatable acoustic source having a narrow beamwidth and being capable of generating frequencies within the audible range of the human ear at the first side of the entrance to said channel;
   b. positioning a second non-linear rotatable acoustic source having a narrow beamwidth and being capable of generating frequencies within the audible range of the human ear at the second side of the entrance to said channel;
   c. generating a first acoustic tone from said first acoustic source; and
   d. rotating said first acoustic source at a predetermined rate thru a predetermined first sector of the water; then
   e. generating a second acoustic tone from said second acoustic source; and
   f. rotating said second acoustic source at a predetermined rate thru a predetermined second sector of the water;
   g. continuing the rotation of the first and second acoustic source thru their respective sectors so that any tone received by a boat operator is indicative of his bearing.
2. The method as described in claim 1 wherein the first predetermined sector is selected to overlap the second predetermined sector.

* * * * *